2,758,102
Patented Aug. 7, 1956

2,758,102

AQUEOUS VEHICLES FOR FORMING WATER RESISTANT FILMS

Oliver J. Grummitt and Albert A. Arters, Cleveland, Ohio, assignors to The Sherwin-Williams Company, Cleveland, Ohio, a corporation of Ohio No Drawing. Application December 10, 1954,
Serial No. 474,582

14 Claims. (Cl. 260—29.6)

This invention relates, as indiacted, to certain novel aqueous vehicles from which may be formed films, which upon drying become resistant to water, soap and ammonia solutions.

In its more specific aspects, this invention relates to certain films obtained by the interaction of polyacrylic acid and zirconium compounds which dry at ordinary temperatures and become water-resistant.

Many materials are known which are soluble in water and therefore useful in making brushable and spraying compositions from which may be formed either pigmented or unpigmented films for the purpose of protectively or decoratively coating various surfaces. The primary objection to these materials, particularly from the standpoint of interior decoration, is the lack of resistance of the films to the solvent effects of water and various soap or alkaline solutions normally used to clean the coated surface.

It is a primary object of this invention, therefore, to provide an aqueous vehicle for use in either the clear or pigmented form for protectively or decoratively coating a surface, which vehicle is characterized in that films formed therefrom upon drying under conditions of normal atmospheric temperature and humidity become resistant to water and alkali or soap solutions normally used to clean the surface.

A further object of this invention is to provide a vehicle which requires no heat or chemical treatment to set the film or induce insolubility in the film, and also one which will not appreciably increase or decrease in viscosity on storage over a considerable period of time, i. e., several months.

Prior art methods for effecting improvement in the resistance to water of films formed from such water-soluble film-forming materials have generally proceeded along the line of desensitizing a coated surface to the effects of water by treatment involving either chemical or heat treatment after the film has been formed on the surface.

Chemical methods for treating coated surfaces have involved washing the dried film with solutions containing acidic salts, mineral acids, aldehydes, dimethylol urea, and certain catalytic materials which cause a chemical change to occur in the film itself.

Other objects of this invention appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that film-forming vehicles containing polyacrylic acid and certain zirconium compounds yield films which on drying become resistant to the solvent effect of water.

Broadly stated, therefore, this invention is in the provision of a homogeneous aqueous solution comprising:

(a) Polyacrylic acid, and
(b) A complex zirconium reaction product, said aqueous solution having a pH within the range from in excess of 7.5 and less than 9.

It will be seen, therefore, that the homogeneous compositions of this invention are comprised of three essential components. The first of these is the water-soluble or water dispersible polyacrylic acid which by itself will form a firm film from an aqueous solution but which remains water-sensitive unless treated in accordance herewith.

The second essential component is a complex ammonium-zirconium carbonate material. These groups are derived from water-soluble zirconum salts, ammonium carbonate and ammonium hydroxide. The ratio of the several characterizing groups to each other may or may not conform to the ratios indicated by the known ammonium zirconyl carbonate $(NH_4)_3HZrO(CO_3)_3$.

The third essential ingredient in which the previous two products are dissolved or dispersed is water.

The water-soluble film-forming material useful herein is polyacrylic acid. The polyacrylic acid obtained commercially is a 25% water solution and this is usually diluted to a 5% concentration for use herein. Polyacrylic acid solid is soluble in water or dispersible in water to an extent sufficient to yield satisfactory filming properties, but without the treatment herein described remains subject to attack by water and water solutions, e. g., soap and ammonia solutions.

As stated before, it is preferred to form the complex zirconium compounds within the reaction mixture. Examples of a few of the water-soluble zirconum salts useful in such an in situ reaction are zirconium oxychloride octahydrate, zirconium tetrachloride, zirconium acetate, zirconium sulphate and zirconium nitrate, etc. These sales, after reaction with polyacrylic acid, are then reacted with ammonium carbonate and ammonium hydroxide to form the vehicle.

Although the chemistry of the reaction involved here is not known, it is believed that the ions supplied by the zirconium-ammonium-carbonate complex combine with the polyacrylic acid in a unique manner to form the desired film-forming material which on drying is resistant to water and alkali.

The source of these ions may be the commercially available ammonium zirconyl carbonate

$$(NH_4)_3HZrO(CO_3)_3$$

However, the films obtained from the vehicles incorporating ammonium zirconyl carbonate, while being useful, are not as satisfactory as the films formed from vehicles incorporating ammonium, zirconyl and carbonate ions supplied from various materials.

Even though the commercial ammonium zirconyl carbonate does supply the type of ions necessary for the present reaction (ammonium, carbonato zirconyl and carbonate), these ions are all present in a ratio established by the composition of the source. Thus, the reaction of polyacrylic acid with the ions supplied by the ammonium zirconyl carbonate is different from the reaction of polyacrylic acid with the ions supplied by the separate materials, e. g., water-soluble zirconium salts, ammonium carbonate and ammonium hydroxide. This is indicated by the fact that films using the commercial product do not exhibit water-resistance to the same degree as the films utilizing the in situ product.

It should be noted at this point that when commercial ammonium zirconyl carbonate is used, ammonium, carbonato zirconyl and carbonate ions are supplied. However, when the complex zirconium reaction product is formed in situ, ammonium, zirconyl and carbonate ions are present. Whatever carbonato zirconyl ions are present in the in situ reaction, if any, are ones which are formed after the addition of the original ions.

The preferred embodiment of this invention then, embraces the formation of the reaction product formed by the reaction of polyacrylic acid with ammonium, zirconyl and carbonate ions, which ions have been supplied from water-soluble zirconium salts, ammonium carbonate and ammonium hydroxide.

It becomes convenient to illustrate the invention by giving specific examples of compositions embodying the invention and the mode of compounding and using them, such examples being, however, for the purpose of illustrating the invention and not limiting it to the precise scope of such examples.

*Example I*

This describes a typical preparation of a coating composition which produces films of satisfactory insolubility. To a 100 ml. solution containing 5% of polyacrylic acid there are added with vigorous mechanical stirring 7.4 g. of zirconium oxychloride octahydrate, and stirring is continued until the thick slurry is homogeneous. This intermediate product is then treated with 14 g. of solid ammonium carbonate and after frothing and gelling all solid material disappears and the mixture becomes liquid. The pH of the mixture at this point is 7.8. The mixture is further alkalinized to a pH of 9 by the addition of 3 ml. of concentrated ammonium hydroxide. Ammonium hydroxide is used because it is a volatile base which aids in curing of the film. Typical of the various pigments or mixtures of pigments that may be used is finely ground mica. When 39 g. of a pigment grade of mica was added to the vehicle the resulting viscosity of the product was 5", as measured by a flow type viscosimeter similar to a Ford Cup.

In this example, 7.4 parts by weight of zirconium oxychloride octahydrate were employed. If other water-soluble zirconium salts are used in place of the zirconium oxychloride octahydrate, the amount employed is calculated to supply approximately 3.8 parts by weight of zirconium dioxide in the form of the water-soluble zirconium salt.

When this coating material was applied to a surface such as paper, wallboard or wood and the water allowed to evaporate, a slightly greyish, light-reflecting film was formed. After aging for 24 hours, the film was not affected when it was wiped with a sponge soaked with warm tap water. An even more rigorous test was applied at the end of one week when the film was unchanged after 50 wipes with a sponge moistened with a detergent solution. When reference is made herein to detergent solution resistance, or wash test, it is meant that detergents such as polyphosphates and the ammoniated variations thereof in aqueous solutions at about 1% concentration and at a temperature of about 50° C. are used in scrubbing the air dried films.

A sponge is used to apply the water or detergent solution to the film being tested and scrubbing is done with moderate pressure in series of ten wipes which are all in the same direction. If the film does not fail during the first ten wipes, three minutes are allowed to elapse and a second series of ten wipes is conducted. This routine of ten wipes with a three minute interval before the next 10 wipes is continued until the film fails. A film is deemed to have failed when its appearance begins to change. As a practical matter, the test is concluded at the end of fifty wipes. When the wash test was applied to the film after 2, 3 and 4 weeks of aging, the film was found to have retained its excellent resistance.

Coating compositions are frequently stored or shipped under conditions of extreme temperature changes. It is important that film-forming properties are not affected by either high or low temperatures. Thus, the composition of Example I was subjected to a heat stability test which consisted of heating a sample sealed in a can or flask in an oven at 60° C. for 72 hours. A cold or freeze-thaw test was conducted by taking a similar sample and subjecting it to three cycles of freezing at a —10° C. and warming to room temperature after each freezing. The composition of this example after being submitted to these tests showed no changes in viscosity which would be indicative of a physical or chemical alteration in the mixture. Heat and freeze-thaw stability were found to be excellent. Films produced from samples subjected to these extreme temperatures were in no way different from the films cast from the original composition.

*Example II*

In order to show that the films produced by the composition of Example I depend upon a chemical interaction of the polyacrylic acid and zirconium, films were prepared from polyacrylic acid alone and from ammonium polyacrylate. A mixture made by adding 25 g. of mica pigment to 100 ml. of 5% polyacrylic acid gave films which, after 4 weeks' aging, would not withstand 10 wipes with the detergent solution.

Ammonium polyacrylate was made by adding 25 ml. of 20% ammonium carbonate solution to 100 ml. of 5% polyacrylic acid. To this were added 3 ml. of ammonium hydroxide and 25 g. of mica pigment. Films from this composition after aging 4 weeks failed to pass 10 wipes with the detergent solution.

*Example III*

As Example II showed, the presence of zirconium is critical in these film-forming compositions. This example describes a series of compositions in which the amount of zirconium relative to the polyacrylic acid was varied. For purposes of comparison the concentration of zirconium has been expressed as a zirconium/carboxyl ratio. For example, in the composition of Example I, the zirconium/carboxyl ratio was 0.33. This ratio is based on the equivalents of zirconium and carboxyl groups present with the carboxyl content of the polyacrylic acid being determined from its neutralization equivalent.

Using the method of Example I, similar compositions were prepared in which the zirconium/carboxyl ratio was 0.10, 0.50 and 1.0. The amount of ammonium carbonate was increased in this order so that the composition was liquid after the addition of the salt. Sufficient ammonium hydroxide was added to bring the final pH to 9.0. The compositions were pigmented with mica. When the washability of the films from these various mixtures was tested, it was found to increase with increasing zirconium/carboxy ratio.

At a ratio of 0.1 the films were not satisfactory in the wash test until about 4 weeks old. At the higher zirconium contents of 0.33–1.0, the films were resistant to washing at the end of about one week. The preferred range of zirconium-carboxyl ratios is from about 0.1 to about 0.5, although ratios outside of this range may be employed.

*Example IV*

This example shows the important advantage of allowing the polyacrylic acid to react with zirconium oxychloride, followed by reaction with ammonium carbonate and ammonium hydroxide. It is to be noted that polyacrylic acid may be reacted with commercial solutions of ammonium zirconyl carbonate. A typical commercial solution of ammonium zirconyl carbonate has a solids content of approximately 35% which is equivalent to about 10% $ZrO_2$. The theoretical composition of ammonium zirconyl carbonate is $(NH_4)_3HZrO(CO_3)_3$, but the actual composition of the commercial material contains excess ammonium and carbonate, as represented by the formula $(NH_4)_{4.6}HZrO(CO_3)_{4.2}$. This composition is said to be more stable on standing than one containing lesser amounts of ammonia and carbonate.

Films prepared with polyacrylic acid and the commercially available solution of ammonium zirconyl carbonate did not exhibit water resistance to the same degree as the films of the preceding examples where the zirconium complex is prepared in situ. For example, a mixture of 100 ml. of 5% polyacrylic acid and 28.2 ml. of ammonium zirconyl carbonate solution (Zr/COOH ratio of 0.33) yielded a semisolid material. This was liquified by the addition of 3 g. of ammonium carbonate followed by 1 ml. of ammonium hydroxide to bring the final pH to 9. Pigmentation consisted of 39 g. of mica. Although this composition had satisfactory heat and freeze-thaw stability, a one-week old film failed to pass 10 wipes with the detergent solution. On ageing, the films gradually became more detergent solution resistant and at the end of 4 weeks they could be washed 30 cycles with the detergent solution. Therefore, the formation of the zirconium complex within the reaction mixture, instead of using commercial ammonium zirconyl carbonate solution, yields films which develop water resistance more rapidly.

*Example V*

For certain applications it may be desirable to plasticize the film, and typical plasticizers for water-soluble or water-dispersible compositions are polyalcohols such as glycerol, pentaerythritol, sorbitol, etc. Such agents may be incorporated into the composition of Example I without altering the heat and freeze-thaw stability and washability. For example, a composition was made from 100 ml. of 5% polyacrylic acid, 3 g. of glycerol, 7.4 g. of zirconium oxychloride octahydrate, 13 g. of ammonium carbonate, 2 ml. of ammonium hydroxide and 54 g. of mica pigment. This mixture had a zirconium/carboxyl ratio of 0.33 and a final pH of 9, and the heat and freeze-thaw stability were satisfactory. One-week-old films withstood 40 wipes with the detergent solution, and at the end of 4 weeks the films could be washed 50 times with the same solution. Films were applied to paper and then flexed in order to observe the flexibility of the film. These compositions appeared to have greater flexibility than compositions which did not contain glycerol.

Similar compositions made with sorbitol as a plasticizer appeared to be equivalent to the glycerol-containing composition.

*Example VI*

In the course of preparing compositions containing varying amounts of ammonium carbonate and ammonium hydroxide it was observed that one important factor in determining heat stability was the final pH of the product. In general, the composition was not fluid and homogeneous until the pH of about 7.5 was obtained. The addition of more ammonium carbonate or ammonium hydroxide to the already liquid composition did not appreciably alter its viscosity. However, a product similar in composition to Example I but with a pH of 7.5 did not have satisfactory heat stability. After heating at 60° C. for 72 hours this product was exceedingly viscous and lumpy and could not be returned to its original condition by mechanical stirring or shaking.

However, by the addition of a small quantity of ammonium hydroxide solution, e. g., 3 ml. in Example I, the pH is raised to about 9 and the product is not affected by 72 hours heating at 60° C. In general, therefore, products of a final pH in excess of 7.5 and less than 9.0 are preferred.

*Example VII*

For certain applications of these compositions, it may be desirable to have a higher viscosity in either the pigmented or unpigmented products. An increase in viscosity over the 5–6 seconds of the preceding examples may be achieved in various ways, as illustrated by these and subsequent examples.

The concentration of polyacrylic acid in the starting solution is a factor which determines final viscosity of the mixture. When the concentration of polyacrylic acid was increased from 5% to 6% and the other components adjusted so as to maintain the zirconium/carboxyl ratio, the pigment-to-solids ratio, and pH constant, it was necessary to use 8.9 g. of zirconium oxychloride octahydrate, 24 g. of ammonium carbonate, 3 ml. of ammonium hydroxide, and 47 g. of pigment. (The pigment-to-solids ratio is 5 where the "solids" is taken as the weight of polyacrylic acid solid plus $ZrO_2$ in the film.) This composition had a final viscosity of 7 secs., compared to 5 secs. of the composition of Example I, and had satisfactory heat stability and washability.

Another composition was prepared from 100 ml. of 10% polyacrylic acid. To maintain the zirconium/carboxyl ratio, 14.8 g. of zirconium oxychloride, 28 g. of ammonium carbonate and 3 ml. of ammonium hydroxide were added. To this mixture were added 64 g. of pigment which made the pigments-to-solids ratio 4/1. The final viscosity of this composition was 13 secs. Heat stability and washability were satisfactory.

*Example VIII*

Another variable in determining final viscosity is the pigment-to-solids ratio. In the foregoing example this ratio was between 4 and 5. In a mixture made from 100 ml. of 5% polyacrylic acid, 7.4 g. of zirconium oxychloride, 14 g. of ammonium carbonate, 3 ml. of ammonium hydroxide and 72 g. of mica pigment, the pigment-to-solids ratio was 9.0, the pH was 9, and final viscosity was 17 secs. This composition exhibited a decrease in heat stability but passed the wash test satisfactorily.

It is possible to achieve higher viscosity by varying both the concentration of the polyacrylic acid solution and the pigment-to-solids ratio. To illustrate this, 100 ml. of 6% polyacrylic acid, 8.9 g. of zirconium oxychloride, 19 g. of ammonium carbonate, 3 ml. of ammonium hydroxide, and 53 g. of pigment were reacted together, as in Example I, with the zirconium/carboxyl ratio being maintained at 0.33 and the pH at 9, but the pigment-to-solids ratio was reduced to 6.5 from 9.0 of the preceding composition. The final viscosity was 15 secs. and resistance to heat and washing was generally satisfactory.

Another method of obtaining higher viscosities in the final composition is by the addition of appropriate quantities of water-soluble or water-dispersible agents commonly known as thickeners. The following examples illustrate the applicability of typical agents of this type.

*Example IX*

The composition of Example I was modified through the addition of 0.4 g. of a guar gum. This was accomplished by mixing the gum with the mica pigment and adding the resulting mixture to the polyacrylic acid-zirconium mixture. The final composition had a pH of 9 and a viscosity of 11 secs., compared to 5 secs. without the gum. This composition passed the heat stability and wash tests satisfactorily.

An increase in the amount of guar gum to 0.6 g. in the same composition gave a final viscosity of 14 secs. and satisfactory heat stability and wash resistance.

This viscosity increasing effect of guar gum has been observed in formulations of zirconium/carboxyl ratios in excess of 0.33 and in formulations containing higher pigment-to-solids ratios than the two preceding compositions.

*Example X*

Another well-known additive for thickening water solutions or dispersions is the sodium salt of carboxymethyl cellulose. The various commercial grades available are described in terms of their viscosity in water solution, i. e., high, medium and low. By the use of suitable quantities of sodium carboxymethyl cellulose the 5″ viscosity of Example I may be increased to as high as 25 secs. Most of these compositions showed acceptable heat stability and washability but excessive amounts of sodium carboxymethyl cellulose decreased the resistance to washing.

A typical composition was made from 100 ml. of 5% polyacrylic acid, 7.4 g. of zirconium oxychloride, 14 g. of ammonium carbonate, 3 ml. of ammonium hydroxide and 1 g. of high viscosity sodium carboxy methyl cellulose which was first blended with 44 g. of pigment. The resulting product had a pH of 9, a viscosity of 11 secs. with the film properties being generally satisfactory.

Another type of thickening agent for water solutions or suspensions are the compounds of silica, such as sodium silicate. However, compared on a weight basis to guar gum or sodium carboxymethylcellulose, sodium silicate is less effective. This is shown in the following example.

*Example XI*

6 g. of sodium silicate solid were added to the composition of Example I. The final product showed only 5–6 secs. viscosity, indicating that considerable quantities of sodium silicate would be required to obtain higher viscosities. Nevertheless, the presence of sodium silicate does not diminish heat stability or washability.

*Example XII*

One variable in these compositions is the ratio of zirconium to polyacrylic acid. It is believed that the insolubility of the film in water is due to a copolymerization or cross-linking reaction between zirconium atoms and the linear molecules of polyacrylic acid. If other organic compounds are added to the composition of Example I, the amount of zirconium should be sufficient to react with both the polyacrylic acid and the additive. If insufficient zirconium is present, the film becomes increasingly sensitive to water and to the alkaline detergent solutions.

Four compositions were prepared in which the zirconium/carboxyl ratio was 0.33, 0.25, 0.17 and 0.10. The first of these was similar to that of Example I, except for the addition of 0.4 g. of guar gum, which produced a final viscosity of 11 secs. In the other three compositions the quantities of zirconium oxychloride (and ammonium carbonate) were adjusted to give the zirconium contents indicated. In each there was 0.4 g. of guar gum.

While all four of these compositions were found to be heat stable, the washability of the films produced decreased with decreasing zirconium content. For example, at a zirconium/carboxyl ratio of 0.33 the one-week-old film passed 50 wipes with the detergent solution while the films from the 0.25, 0.17 and 0.10 ratio compositions failed to withstand more than 20 wipes. At the end of four weeks the first film still passed 50 wipes but the films of the other three compositions showed signs of failure at 20 wipes or less with the detergent solution.

It is to be noted that improvement in the water-resistance, detergent solution resistance, etc., of the improved polyacrylic acid films begins at the very start of the addition of zirconium and continues to improve with the increase in the zirconium to carboxyl ratio. Although zirconium to carboxyl ratios of from about 0.05 to about 2 have been set as a working range, with the preferred range being from about 0.1 to about 0.5, a ratio of about 0.33 has been found to be substantially the optimum, all factors considered.

*Example XIII*

Although mica has been used as a pigment in the compositions of the preceding examples, others may also be used. For example, compositions similar to that of Example I have been made in which the mica was replaced by a pigment grade of titanium dioxide or of lead acid phosphate. The viscosity, pH and other characteristics of the final compositions were essentially the same as in Example I. These new compositions showed satisfactory heat and freeze-thaw stability, and the washability with detergent solution of the films formed therefrom one week old was satisfactory in comparison with similar films containing mica as the pigment.

The novel vehicles of this invention may be pigmented with one or more of a large number of white or colored inorganic or organic pigments. However, since the vehicle is alkaline, pigments of a strongly acidic character should not be used.

Examples of some of the white pigments useful herein are mica, titanium dioxide, lead acid phosphate, white lead, lithopone, lead silicate and lead cyanamid.

Examples of some of the colored pigments useful herein are the iron oxides, phthalocyanine blue, hansa yellow and the chrome yellows.

Such pigments are usually employed herein in amounts ranging from about a 4 to 1 to about a 10 to 1 pigment-to-solids ratio.

*Example XIV*

This example illustrates that the order of addition of the various components in the preparation of this vehicle is important in determining the properties of the vehicle. A composition made of the same components and in the same proportions as that of Example I was prepared in the following manner: The ammonium carbonate was slurried with a minimum amount of water at room temperature and to this slurry was added the zirconium oxychloride octahydrate. When the reaction subsided, as indicated by the absence of evolved carbon dioxide, the polyacrylic acid in the form of a 6% solution was added, followed by the ammonium hydroxide and pigment. A 6% solution of polyacrylic acid was used in order to compensate for the water used in the initial steps. The product thus formed developed water resistance at a slower rate than the product of Example I.

The first step of this modified procedure may be further altered by adding solid ammonium carbonate to a water solution of the zirconium oxychloride. Here again, the film develops resistance to water at a slower rate than that of Example I.

Another order of preparation was attempted which, like Example I, starts with the 5% solution of polyacrylic acid. Instead of adding the zirconium oxychloride at this point, as is done in Example I, the ammonium hydroxide and ammonium carbonate are added to the polyacrylic acid. This is followed by the addition of the zirconium oxychloride and pigment. While the heat and freeze-thaw stability of this composition was satisfactory, the films formed therefrom developed water resistance at a much slower rate than the other methods of preparation described. The preferred order of preparation of these novel compositions, therefore, is that of Example I, wherein the zirconium oxychloride octahydrate is added to the polyacrylic acid solution. When that reaction is complete, the ammonium carbonate and ammonium hydroxide are then added, followed by the addition of pigment.

It is to be emphasized that ammonium zirconyl complexes other than ammonium zirconyl carbonate may be employed herein. Examples of some of these complexes are the ammonium zirconyl salts of such acids as lactic, glycolic and mandelic. However, the ammonium, zirconyl, and carbonate ions are employed in the preferred embodiment of this invention.

Although only ammonium hydroxide has been shown as the volatile base used for increasing the alkalinity of the novel vehicles described herein, water solutions of certain volatile organic lower amines such as methyl amine, tri-ethyl amine and morpholine may be used. However, it is preferred to employ ammonium hydroxide for this purpose.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A homogeneous aqueous solution comprising: (a) polyacrylic acid, and (b) ammonium ions, zirconyl ions and ions selected from the group consisting of carbonate ions, lactate ions, glycolate ions and mandelate ions, said aqueous solution having a pH within the range of from in excess of 7.5 and less than 9.

2. A homogeneous aqueous solution comprising: (a) polyacrylic acid, and (b) ammonium, zirconyl and carbonate ions, said aqueous solution having a pH within the range of from in excess of 7.5 and less than 9.

3. A homogeneous aqueous solution comprising: (a) polyacrylic acid, and (b) a complex zirconium reaction product formed from a water-soluble zirconium salt, ammonium carbonate and ammonium hydroxide, said aqueous solution having a pH within the range of from in excess of 7.5 and less than 9.

4. The composition of claim 2 wherein the water-soluble zirconium salt is zirconium oxychloride octahydrate.

5. A homogeneous aqueous solution comprising: (a) a 5% solution of polyacrylic acid in water, (b) a water-soluble zirconium salt in an amount sufficient to yield a zirconium to carboxyl ratio of from about 0.05 to about 2, (c) ammonium carbonate in an amount sufficient to liquify said mixture of polyacrylic acid and zirconium salt, and (d) ammonium hydroxide in an amount sufficient to maintain the pH of said aqueous mixture in excess of 7.5 and less than 9.

6. A homogeneous aqueous solution comprising: (a) 100 parts by weight of a 5% polyacrylic acid water solution, (b) 3.8 parts by weight of zirconium dioxide in the form of a water-soluble zirconium salt, (c) 14.0 parts by weight of ammonium carbonate, and (d) 2.7 parts by weight of ammonium hydroxide.

7. The composition of claim 5 wherein the water-soluble zirconium salt is zirconium oxychloride octahydrate.

8. The composition of claim 5 wherein the water-soluble zirconium salt is zirconium tetrachloride.

9. The composition of claim 5 wherein the water-soluble salt is zirconium acetate.

10. The composition of claim 5 wherein the water-soluble zirconium salt is zirconium sulphate.

11. The method of making a stable homogeneous aqueous solution of a water-dispersible film-forming material which comprises the steps of dissolving polyacrylic acid in water, adding to said water solution of polyacrylic acid a water-soluble zirconium salt with vigorous agitation, continuing the agitation until the mixture is homogeneous, adding ammonium carbonate with agitation, continuing the agitation until all frothing and gelling has disappeared and the solution has become liquid, and adjusting the pH of the resultant solution to more than 7.5 and less than 9.

12. The method of claim 7 wherein the zirconium salt is zirconium oxychloride octahydrate.

13. The method of making a stable homogeneous aqueous solution of a water-dispersible film-forming material which comprises the steps of dissolving polyacrylic acid in water, adding with agitation ammonium zirconyl carbonate to said water solution of polyacrylic acid and adjusting the pH of the resultant solution to more than 7.5 and less than 9.

14. A homogeneous aqueous solution comprising: (a) polyacrylic acid, and (b) an ammonium-zirconyl salt complex of an acid selected from the group consisting of carbonic, glycolic, lactic and mandelic, said aqueous solution having a pH within the range of from in excess of 7.5 and less than 9.

No references cited.